Patented Oct. 25, 1938

2,134,055

UNITED STATES PATENT OFFICE 2,134,055

METHOD OF MAKING CADMIUM RED

Walter F. Meister, Elizabeth, N. J., assignor, by mesne assignments, to Interchemical Corporation, New York, N. Y., a corporation of Ohio No Drawing. Application January 31, 1938, Serial No. 187,898

10 Claims. (Cl. 134—58)

This invention relates to a method of making cadmium red, and aims to provide an improved product at a reduced cost of manufacture.

This application is a continuation in part of my co-pending application Serial No. 89,772, filed July 9, 1936.

"Cadmium red" is used herein to indicate any one of the series of pigments varying in color from bright orange to dark red and having the composition $x$CdS/$y$CdSe. "Cadmium thioselenide" is used herein to identify the dull, brownish material containing cadmium, sulphur and selenium which has heretofore been formulated CdSSe$_x$. My own researches indicate that this substance is not an indefinite compound as indicated by the formula CdSSe$_x$, but rather an indefinite mixture of two definite compounds, which should be formulated $x$CdS+$y$CdSSe$_2$.

In accordance with my invention, cadmium red is obtained by calcining cadmium thioselenide in the presence of cadmium oxide. To carry out the method, cadmium thioselenide is mixed, prior to calcination, with cadmium oxide or with a cadmium compound, such as the carbonate or the hydroxide, which is decomposable into cadmium oxide by the heat of calcination. I preferably include in the mixture which is to be calcined a quantity of cadmium sulphide sufficient to produce the sulphur-to-selenium ratio in the final product required to give the color desired. If an extended pigment is desired, barium sulphate is also included in the mixture to be calcined.

For best theoretical results, the amount of cadmium oxide or of the compound decomposable into cadmium oxide bears a proportion to the amount of cadmium thioselenide which makes the number of molecules of cadmium oxide equal to one-half the number of atoms of selenium.

My process differs from prior processes in which cadmium red has been produced by calcining cadmium thioselenide either alone or with cadmium sulphide or with cadmium sulphide and barium sulphate, in that the loss of selenium which has occurred in prior processes may be substantially reduced and even entirely eliminated by my process. Besides effecting a substantial economy by eliminating loss of selenium, my process produces a pigment which is cleaner and brighter than those of prior processes.

I believe that the reaction which occurs in my process may be indicated as follows:

$$x\text{CdS} + y\text{CdSSe}_2 + y\text{CdO} \longrightarrow$$
$$x\text{CdS} + 2y\text{CdSe} + \frac{y}{2}\text{SO}_2 + \frac{y}{2}\text{S}$$

This formulation indicates that when the molecular proportions above specified are used, the loss of selenium may be entirely eliminated without leaving any excess of cadmium oxide in the final product. This is important since excess cadmium oxide in the final product deleteriously affects the color of the pigment.

In the practical carrying out of my process, it is often desirable to use somewhat less cadmium oxide than the specified molecular proportions in order to avoid the possibility of any unreacted cadmium oxide in the final product, and it is important that the calcination be carried out in a neutral atmosphere in order to avoid the formation of any additional cadmium oxide during the calcination. I find it most desirable in practice to make the number of molecules of cadmium oxide or of the compound decomposable into cadmium oxide only approximately equal to one-half the number of atoms of selenium, that is, a few per cent. less than required by the specified molecular proportion. It should be noted that the use of any cadmium oxide results in reduced loss of selenium, so that the advantage of my process can be obtained to some extent by the use of any amount of cadmium oxide less than that required by the specified molecular proportion, and to the greatest extent by an amount approximately equal to that required by the specified molecular proportion.

The cadmium thioselenide used in my process may be made by known methods, as, for example, by precipitating a solution of selenium in a water solution of barium or sodium sulphide with cadmium sulphate; but so far as my process is concerned, it is immaterial how the cadmium thioselenide is made, since it constitutes one of the starting materials in my process. The cadmium oxide or the compound decomposable into cadmium oxide may be mixed with a cadmium thioselenide after the cadmium thioselenide has been made, or, if preferred, may be mixed with the reagents used in making the cadmium thioselenide. In some instances, the compound decomposable into cadmium oxide may consist of an excess of one of the reagents used in making the cadmium thioselenide. The calcination is effected at a temperature of from 1200° F. to 1500° F. in a closed furnace in which a neutral atmosphere, such as an atmosphere of carbon dioxide, is maintained in order to avoid the formation of cadmium oxide which would contaminate the pigment. For the same reason the calcined pigment is quenched in water without contact with the air.

What I claim is:

1. The process of making cadmium red which comprises calcining in a neutral atmosphere cadmium thioselenide in admixture with a number of molecules of cadmium oxide less than one-half the number of atoms of selenium contained in the cadmium thioselenide.

2. The process of making cadmium red which comprises calcining cadmium thioselenide in admixture with a number of molecules of cadmium oxide approximately equal to one-half the number of atoms of selenium contained in the cadmium thioselenide.

3. The process of making cadmium red which comprises making a mixture of cadmium thioselenide and a cadmium compound selected from the class consisting of cadmium oxide and cadmium compounds decomposable by heat into cadmium oxide, the proportions of the mixture being such that the number of molecules of cadmium oxide is less than one-half the number of atoms of selenium so that, while the cadmium oxide reduces the loss of selenium, no excess of cadmium oxide remains in the product, and calcining the mixture in a neutral atmosphere to avoid the formation of additional cadmium oxide.

4. The process of making cadmium red which comprises making a mixture of cadmium thioselenide and a cadmium compound selected from the class consisting of cadmium oxide and cadmium compounds decomposable by heat into cadmium oxide, the proportions of the mixture being such that the number of molecules of cadmium oxide is approximately equal to one-half the number of atoms of selenium, and calcining the mixture.

5. The process of making cadmium red which comprises calcining in a neutral atmosphere cadmium thioselenide and cadmium sulphide in admixture with a number of molecules of cadmium oxide less than one-half the number of atoms of selenium contained in the cadmium thioselenide.

6. The process of making extended cadmium red which comprises calcining in a neutral atmosphere cadmium thioselenide and barium sulphate in admixture with a number of molecules of cadmium oxide less than one-half the number of atoms of selenium contained in the cadmium thioselenide.

7. The process of making cadmium red which comprises calcining cadmium thioselenide and cadmium sulphide in admixture with cadmium oxide, the number of molecules of cadmium oxide being approximately equal to one-half the number of atoms of selenium.

8. The process of making extended cadmium red which comprises calcining cadmium thioselenide, cadmium sulphide and barium sulphate in admixture with cadmium oxide, the number of molecules of cadmium oxide being approximately equal to one-half the number of atoms of selenium.

9. The process of making extended cadmium red which comprises making a mixture of cadmium thioselenide and barium sulphate with a cadmium compound selected from the class consisting of cadmium oxide and cadmium compounds decomposable by heat into cadmium oxide, the proportions of the mixture being such that the number of molecules of cadmium oxide is less than one-half the number of atoms of selenium, so that while the cadmium oxide reduces the loss of selenium no excess of cadmium oxide remains in the product, and calcining the mixture in a neutral atmosphere to avoid the formation of additional cadmium oxide.

10. The process of making cadmium red which comprises making a mixture of the material precipitated by cadmium sulphate from a solution of selenium in barium sulphide with a cadmium compound selected from the class consisting of cadmium oxide and cadmium compounds decomposable into cadmium oxide by heat, and calcining the mixture.

WALTER F. MEISTER.